United States Patent [19]

Chow et al.

[11] 4,303,775
[45] Dec. 1, 1981

[54] NOVEL ACETYLENE END-CAPPED ESTERIMIDES

[75] Inventors: Wai Y. Chow; S. Paul Thackaberry, both of Houston, Tex.

[73] Assignee: Gulf Oil Corporation, Pittsburgh, Pa.

[21] Appl. No.: 72,948

[22] Filed: Sep. 6, 1979

[51] Int. Cl.$^3$ ............................................. C08G 69/44
[52] U.S. Cl. .................... 528/170; 260/326 S; 260/326 N; 560/76; 560/37; 560/86; 528/172; 528/188; 528/353
[58] Field of Search ............... 528/353, 170, 172, 188; 560/76, 86, 37; 260/326 S, 326 N

[56] References Cited

U.S. PATENT DOCUMENTS

| 3,879,349 | 4/1975 | Bilow et al. | 528/170 |
|---|---|---|---|
| 4,058,505 | 11/1977 | D'Alelio | 528/353 |
| 4,060,515 | 11/1977 | D'Alelio | 528/353 |
| 4,108,836 | 8/1978 | Bilow | 528/128 |
| 4,168,360 | 9/1979 | D'Alelio | 528/353 |

*Primary Examiner*—Lucille M. Phynes
*Attorney, Agent, or Firm*—Richard L. Kelly

[57] ABSTRACT

A group of heat curable resins are provided which have good physical properties, which properties are retained to a surprising degree after prolonged exposure to temperatures as high as 300° C. The products are acetylene end-capped esterimides having the structure:

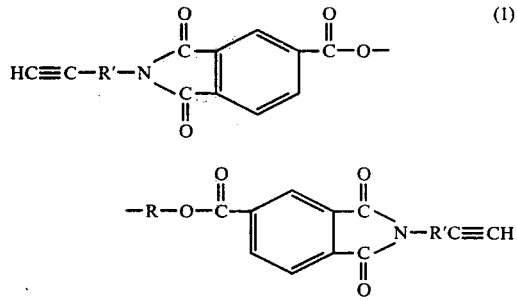

where R is an arylene group or a group having the structure:

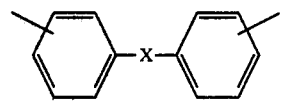

where X is

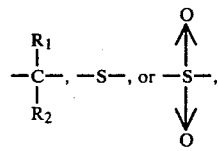

$R_1$ is an alkyl group containing 1 or 2 carbon atoms and $R_2$ is hydrogen or an alkyl group containing 1 or 2 carbon atoms; and where R' is a phenylene group.

15 Claims, No Drawings

NOVEL ACETYLENE END-CAPPED ESTERIMIDES

BACKGROUND OF THE INVENTION

There is a growing interest in the art in the development of polymeric materials which have good strength and retain a considerable portion of their strength after extended exposure to high temperature. Acetylene end-capped polyimide oligomers of the type disclosed in U.S. Pat. Nos. 3,845,018 and 3,897,349 are a prime example of products having this combination of properties.

Polyimides of the type referred to above, while having excellent physical properties and good retention of these physical properties after prolonged exposure to high temperature, are subject to two recognized shortcomings. First, these polyimides must be prepared from aromatic diamines of specific structures to obtain the desired high temperature performance properties. Unfortunately, such aromatic diamines are difficult to synthesize and are expensive. In addition, the melting points of the polyimides are very close to their curing temperatures. For this reason, the polyimides are difficult to process. In particular, they are very difficult to mold.

For the above reasons, there is a continuing need in the art for heat-curable resins having good high temperature performance properties and which can be prepared at more moderate cost. In addition, there is a need in the art for resins of this type which can be more readily processed and, in particular, can be more readily molded.

SUMMARY OF THE INVENTION

The products of the invention are heat-curable esterimides having the structure:

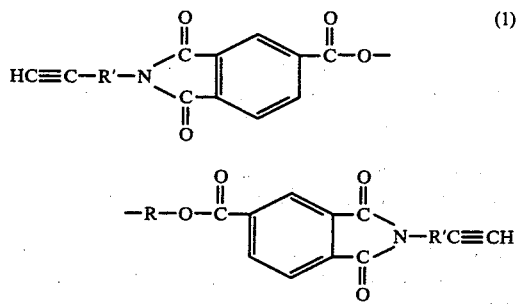

(1)

where R is an arylene group or a group having the structure:

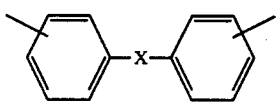

where X is

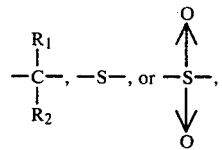

$R_1$ is an alkyl group containing 1 or 2 carbon atoms and $R_2$ is hydrogen or an alkyl group containing 1 or 2 carbon atoms; and where R' is a phenylene group.

The preferred products have the structure:

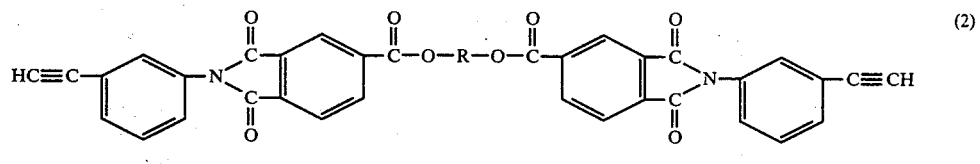

(2)

where R has the same meaning as in (1).

DETAILED DESCRIPTION OF THE INVENTION

The acetylene end-capped esterimides of the invention are prepared by reacting an aminophenylacetylene with a complex, highly aromatic diester having an anhydride group on each end of the molecule.

The aminophenyl acetylenes employed in the reaction have the structure:

$$H_2N-R^1-C\equiv CH \qquad (3)$$

where R' is a phenylene group. Examples of suitable aminophenylacetylenes include 3-aminophenylacetylene, 4-aminophenylacetylene, and analogues thereof containing halogen atoms and/or alkyl groups attached to the phenyl ring.

The complex, highly aromatic diesters having anhydride groups attached to the two ends of the molecule have the structure:

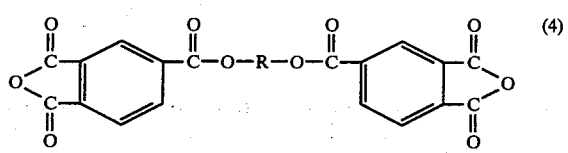

(4)

where R has the same meaning as in formula (1).

The aromatic diesters conforming to the formula (4) can be prepared by either of two synthesis methods. In the first method, 1 mol of a diphenol is reacted with 2 mols of the acid chloride of trimellitic anhydride. In the second method, 1 mol of the diacetate of a diphenol is reacted with 2 mols of trimellitic anhydride.

Where a diphenol is employed in the preparation of the aromatic diesters of (4), it will have the structure:

$$HO-R-OH \qquad (5)$$

In the above formula, R can be an arylene group such as a phenylene group, naphthylene group, or a biphenylene group, which optionally can carry non-interfering substituents on the aromatic rings such as alkyl groups and halogen atoms. For reasons subsequently developed, the preferred diphenols have the structure:

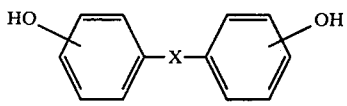

where X is

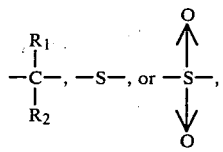

$R_1$ is an alkyl group containing 1 or 2 carbon atoms and $R_2$ is hydrogen or an alkyl group containing 1 or 2 carbon atoms. In the above structures, the aromatic rings may, if desired, carry non-interfering substituent groups such as alkyl groups and halogen atoms. Examples of suitable diphenols include hydroquinone, resorcinol, the various isomeric dihydroxyl naphthalenes, bisphenol-A, thiodiphenol, sulfonyldiphenol and the like. The diacetates of diphenols employed will have the same structure as the diphenols, except that the phenolic hydroxyl group will have been acetylated.

In the first method of preparing the aromatic diesters, the acid chloride of trimellitic anhydride is dissolved in a suitable solvent such as dimethylformamide (DMF) or dimethylacetamide (DMA). The solution is cooled to 5° C. or lower and a solution of the diphenol in a suitable solvent is added in small increments with stirring, while maintaining the reaction temperature below that previously described. The diphenol is added in a ratio of 0.5 mol per mol of the acid chloride of the trimellitic anhydride. Since hydrogen chloride is formed as a coproduct, an acid acceptor, such as an amine, is included in the reaction mixture; the amine being conveniently included in the solution with the diphenol. The amine is employed in a quantity at least molarly equivalent to the acid chloride of trimellitic anhydride.

In the second method for preparing the aromatic diesters, trimellitic anhydride and the diacetate of the diphenol (in a 2/1 molar ratio) are mixed and heated to a temperature sufficiently high to distill acetic acid from the reaction mixture. A small sweep of an inert gas, such as nitrogen, preferably is fed through the reaction mixture to assist in removing the acetic acid. Vacuum is preferably applied in the final stage of the reaction to assist in removing the acetic acid.

In preparing the desired esterimide, one mol of the aromatic diester of formula (4) is dissolved in a solvent such as DMF, or preferably N-methyl-2-pyrrolidone (NMP). To this solution is added 2 mols of an aminophenylacetylene of formula (3). The aminophenylacetylene can be added in neat form but, for convenience, preferably is added as a solution in the same solvent employed to dissolve the aromatic diester. This reaction proceeds at ambient temperature although, for convenience, the reaction is conventionally run at 50° C., or somewhat higher, so as to maintain a desirably high concentration of the aromatic diester in the solvent. This reaction provides an intermediate amic acid product having the structure:

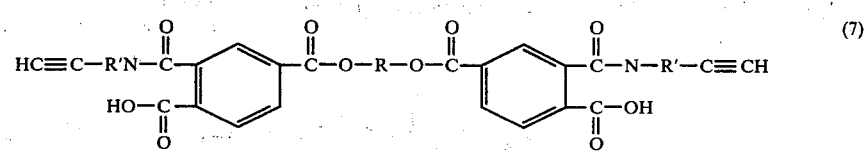

where R and R' have the same meaning as in (1).

The amic acid intermediate product of formula (7) can be converted to the desired acetylene end-capped esterimide by effecting ring closure of the amic acid groups by a dehydration reaction. Such methods are reported in the art, particularly the Barie U.S. Pat. No. 4,097,456 whose descriptions are incorporated herein by reference. A preferred method involves adding to the amic acid intermediate product a solvent which forms an azeotrope with water and heating the reaction mixture to remove water as an azeotrope. Convenient solvents of this type which can be employed include acetic anhydride and aromatic hydrocarbons such as benzene, toluene, and xylene.

Another synthesis route to the desired esterimides involves esterifying an aromatic diester of formula (4) with a lower alkanol containing up to about 6 carbon atoms to form half esters on each end of the molecule. This half ester then is reacted with 2 mols of an aminophenylacetylene of formula (3) to form an amine acid salt having the structure:

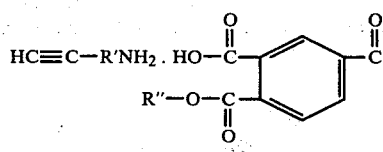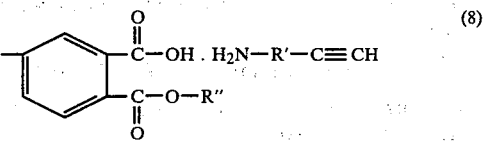

where R and R' have the same meaning as in (1) and R" is the alkyl group desired from the alkanol.

The above reaction typically is run in an alkanol solvent to prepare a final solution containing a high concentration of the product of formula (8). The solids can be recovered and heated to effect ring closure to form imide groups and yield the desired esterimides. This step can be carried out by techniques essentially similar to those disclosed in Antonoplos et al U.S. Pat. No. 4,218,555, which descriptions are incorporated herein by reference. The solids also can be converted to a solid state for storage or shipment by careful spray drying employing the conditions set forth in the Antonoplos et al application and earlier incorporated herein by reference. These solids then can be dissolved in a suitable solvent to prepare coating and/or laminating solutions. Typical solvents that can be employed contain up to about 6 carbon atoms and are alkanols, ethers, or ketones.

Utility of Products

The acetylene end-capped esterimides of the invention can be molded and heat cured to provide moldings having excellent strength, which strength is retained to a surprising degree even after the molded articles are heated for extended periods of time at elevated temperatures, e.g., 500 or more hours at 315° C. (600° F.). Moreover, the products before being cured, have adequate flow to be processed satisfactorily.

As noted infra, the esterimides prepared from the diphenols of formula (6) have relatively low melting points and long gel times. These products are particularly well suited for fabrication by injection molding.

In addition to being employed to prepare moldings, the acetylene end-capped esterimides can be used to lay down tough coatings on substrates such as metals and to prepare laminates and/or composite structures. To prepare such structures, a web of inorganic fibers such as glass, quartz, graphite fibers or the like, is impregnated with a solution containing the esterimide solids. The impregnated web then is heated to cross-link the esterimide.

The coating and laminating varnishes can be prepared by dissolving the estermide in a suitable solvent. DMA, DMF, and NMP have good solvent power for all of the esterimides of formula (1). The esterimides prepared from diphenols of formula (6) also are soluble in solvents such as ketones and lower ethers which contain up to about 6 carbon atoms. Examples of such solvents include acetone, methyl ethyl ketone, methyl isobutyl ketone, diethyl ether, diisopropyl ether, the methyl ether of ethylene or diethylene glycol, tetrahydrofuran and the like.

Where it is desired to prepare coatings, laminates or composites, it is possible and frequently desirable to prepare such articles from a precursor of the esterimide. Either of the two previously described precursors, i.e., of the structure shown in formula (7) and formula (8) can be employed. When the precursors are heated, they form the esterimide structure shown in formula (1) and upon further heating form cross-linked products. The advantage of employing the precursors is that they frequently have a much higher solubility in solvents. As a consequence, higher solids levels can be incorporated into the laminate or composite. It is possible to prepare solutions which contain at least 30 weight % of the product of formula (7) in solvents such as NMP. It is possible to prepare solutions containing at least 50 weight % of the product of formula (8) in solvents such as the 1-6 carbon alkanols.

When used as coating compositions, the precursor solution should be laid down on the substrate and heat cured at temperatures of 175° C. or higher. To prepare laminates, the desired web should be impregnated with a precursor solution and heated to an elevated temperature for a time sufficient to convert the precursor solids to imides. Drying the impregnated web for 60 minutes at 150° C. or 80 minutes at 135° C. in a circulating air oven is usually sufficient. The dried webs then can be laid up and heated under pressure to cross-link the resin solids. Modest pressures of the order of 15-200 psig are sufficient. Curing temperatures of the order of 177°-260° C. and preferably 195°-220° C. are employed for curing times of the order of 1-12 hours. Optimum properties are developed by post curing the laminates for periods of 16-48 hours at temperatures of about 260°-375° C.

The following examples are set forth to illustrate the principle and practice of the invention to those skilled in the art. Where parts and percentages are set forth, unless otherwise noted, they are parts and percentages expressed on a weight basis.

EXAMPLE 1

Part A

A three-neck round bottom flask equipped with a mechanical stirrer, a Claisen head with receiver and vacuum take-off, and a glass bleed inlet was charged with 38.8 gm. (0.3 mol) of hydroquinone diacetate, 76.8 gm. (0.4 mol) of trimellitic anhydride, and 0.18 gm. of sodium acetate. The mixture was heated to 250° C. with a slow flow of nitrogen being passed through the mixture. At this temperature, acetic acid started to distill from the reaction mixture. In a period of one hour, approximately 80% of the theoretical quantity of acetic acid was collected. The pressure then was reduced to about 1 mm of mercury and heating was continued for another hour at 250° C. The product was washed with acetone and dried in a vacuum oven at 75° C. for about 16 hours. A product having a melting point of 283° C. was obtained in a 77% yield. The infrared and the nuclear magnetic resonance spectra were consistent with the proposed structure.

Part B

A three-neck round bottom flask, equipped with a mechanical stirrer, a condenser, and a dropping funnel was charged with 13.7 gm. (0.03 mol), the product of Part A, and 230 ml of N-methyl-2-pyrrolidone (NMP). The mixture was heated to 50° C. with stirring until the reaction product of Part A was completely dissolved. While maintaining this temperature, a solution containing 7 gm. (0.06 mol) of 3-aminophenyl acetylene dissolved in 60 ml. of NMP was added, dropwise, over a period of 30 minutes.

Part C

The flask of Part B then was fitted with a Dean-Stark trap and 100 ml of xylene was charged to the reaction mixture. The reaction mixture was refluxed for two hours and the theoretical amount of water was collected. After cooling, the reaction mixture was poured into three liters of ethanol to precipitate the desired acetylene end-capped esterimide. The precipitate was washed with several aliquots of ethanol and dried in a vacuum oven for 16 hours at 100° C. The infrared and nuclear magnetic resonance spectra were consistent with the proposed structure. The ratio of aromatic protons to acetylenic protons is 8.85/1.0.

EXAMPLE 2

Part A A three-neck round bottom flask equipped with a mechanical stirrer, a condenser, and a dropping funnel, was charged with 21 gm. (0.1 mol) of the acid chloride of trimellitic anhydride and 300 ml of dimethylacetamide (DMA). The flask was cooled to 0°-5° C. with an ice bath and 5.5 gm. (0.05 mol) of hydroquinone and 10.1 gm. (0.1 mol) of triethylamine dissolved in 100 ml of DMA was added, dropwise, over a period of period of 1.5 hours. The reaction was stirred at the same temperature for an additional 2 hours. The reaction mixture was filtered and the solids rinsed with 100 ml of DMA. The combined DMA filtrate and washings were concentrated under vacuum. The solid was washed with acetone, and dried in a vacuum oven at 75° C. for 16 hours. A yield of 53% was obtained. The infrared and nuclear magnetic resonance spectra were identical to those of the product obtained in Example 1, Part A.

Part B

The product of Part A was reacted with 3-aminophenylacetylene employing the same procedures described in Example 1, Parts B and C. The product obtained was indistinguishable from the product of Example 1, Part C.

EXAMPLE 3

A diester was prepared from the diacetate of resorcinol and trimellitic anhydride following the procedure of Example 1, Part A. As the product had substantial solubility in acetone, it was purified by washing with hexane and had a melting point of 170° C. The diester was converted to the desired esterimide by the procedures of Example 1, Parts B and C.

EXAMPLE 4

An esterimide was prepared from the diacetate of biphenol-A following the procedure of Example 3. The intermediate diester melted at 100° C.

EXAMPLES 5 AND 6

Esterimides were prepared from the diacetates sulfonyldiphenol (Examle 5) and thiodiphenol (Example 6) following the procedure of Example 3.

The melting point of each of the esterimides of Examples 1, 3, 4, 5, and 6 was determined. The time for each of the products to form an infusible gel at the melting point was noted. The results are set forth in Table I.

TABLE I

| Product | Melting Point, °C. | Gel Time @ Melting Point |
|---|---|---|
| Example 1 | 285 | 14 seconds |
| Example 3 | 220 | 54 seconds |
| Example 4 | 140 | >25 minutes |
| Example 5 | 195 | 180 seconds |
| Example 6 | 185 | >20 minutes |

The solubility of the esterimides in acetone at 20° C. was determined for each of the products of Examples 1, 3, 4, 5, and 6. The products of Examples 1 and 3 were substantially insoluble in that less than 0.1 part of the esterimide dissolved in 100 parts of the acetone. The products of Examples 4 and 5 dissolved to the extent of greater than about 22 and 5 parts per 100 parts of acetone, respectively. The product of Example 6 was soluble to the extent of about 1.0 part per 100 parts of acetone.

The infrared and the nuclear magnetic resonance spectra were taken for each of the products of Examples 1 and 3–6. In each case, the spectra were consistent with the proposed structure.

Laminates having excellent physical properties can be prepared from the esterimides of Example 1 and 3–6 by the following procedures. Impregnate graphite tapes, e.g., 5" wide tapes of a commercial product sold under the name Celion 3000, having an O twist, and bearing an NR 150-B2 surface size. The esterimide solution employed should have a high solids content, preferably at least 25 weight %. The tapes should be impregnated and dried until they contain about 40 weight % resin solids. Typically the prepregs will be 2.5 mils thick. A laminate lay-up then is made from 32 plys with the prepregs all being aligned in one direction. The lay-up is laminated by a vacuum bag technique with the assembly being heated from ambient temperature to 265° F. with the temperature being increased at a rate of about 5°/minute under a vacuum of 15 inches of Hg. The assembly is maintained for an additional 2-hour period under 15 inches of Hg. The pressure then is reduced to the maximum vacuum that can be drawn and the temperature is increased to 485° F. at a rate of about 7° F./minute. The laminate is held at 485° F. for an additional period of 2 hours. The laminate is cooled to room temperature over a period of 5 hours. The laminate is post cured by heating from room temperature to 650° F. at a rate of 5°-10° F./minute and then heating for 13 hours at 650° F. The temperature then is increased to 700° F. at a rate of 5°-10° F./minute. The temperature then is held at 700° F. for an additional 4 hours.

The Short Beam Shear, Flexural Strength, and Tangent Modulus of Elasticity, as determined by ASTM procedures at room temperature and at 600° F., typically will have the values set forth in Table II.

TABLE II

| Property | Room Temperature Value | 600° F. Value |
|---|---|---|
| Short Beam Shear | 12 ksi | 7 ksi |
| Flexural Strength | 200 ksi | 140 ksi |
| Tangent Modulus of Elasticity | $20 \times 10^6$ ksi | $19 \times 10^6$ ksi |

The laminates, when heated for 300 hours at 600° F., will have a weight loss of only about 2%.

To prepare laminates from the amic acid products of formula (7), impregnate a web, e.g., six-inch squares of 181 E glass cloth (with an A-1100 finish) with a resin solution of the type prepared in Example 1, Part B. When these samples are heated for 30 minutes in a circulating air oven at 150° C. and extracted with NMP for chromatographic, NMR and I.R. analysis, the extracted product will contain no evidence of carboxyl groups. These data indicate that all of the amic acid groups have been converted to imide groups. When these impregnated cloths are laminated and cured, they have properties essentially indistinguishable from laminates prepared directly from the corresponding esterimides.

Laminates and/or coatings can be prepared from alkanol solutions of the amine-acid salts of formula (8)

by methods analagous to those described immediately above.

What is claimed:

1. A heat-curable acetylene end-capped esterimide having the structure:

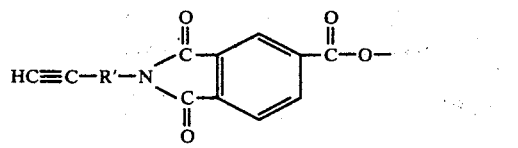

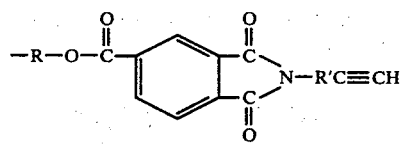

where R is an arylene group or a group having the structure:

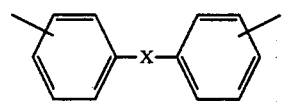

where X is

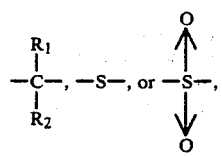

$R_1$ is an alkyl group containing 1 or 2 carbon atoms and $R_2$ is hydrogen or an alkyl group containing 1 or 2 carbon atoms; and where R' is a phenylene group.

2. A heat-curable end-capped esterimide having the structure:

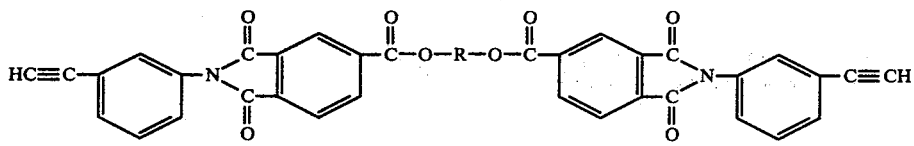

where R is an arylene group or a group having the structure:

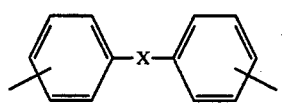

where X is

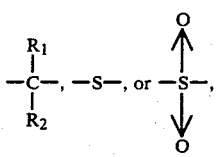

$R_1$ is an alkyl group containing 1 or 2 carbon atoms and $R_2$ is hydrogen or an alkyl group containing 1 or 2 carbon atoms.

3. A heat-curable acetylene end-capped esterimide of claim 1 in which R is a phenylene group.

4. A heat-curable acetylene end-capped esterimide of claim 1 in which R has the structure:

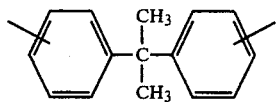

5. A heat-curable acetylene end-capped esterimide of claim 1 in which R has the structure:

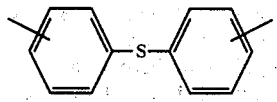

6. A heat-curable acetylene end-capped esterimide of claim 1 in which R has the structure:

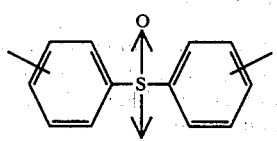

7. A heat-curable acetylene end-capped esterimide of claim 2 in which R is a phenylene group.

8. A heat-curable acetylene end-capped esterimide of claim 2 in which R has the structure:

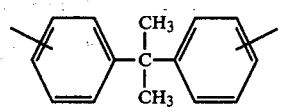

9. A heat-curable acetylene end-capped esterimide of claim 2 in which R has the structure:

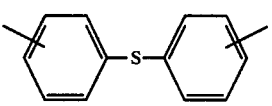

10. A heat-curable acetylene end-capped esterimide of claim 2 in which R has the structure:

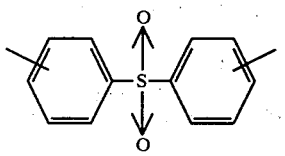

11. A coating and laminating varnish consisting essentially of a product of claim 4, 5, 6, 8, 9, or 10 dissolved in a dialkyl ketone or a lower ether, said solvent containing up to about 6 carbon atoms.

12. A process for preparing a heat-curable acetylene end-capped esterimide of claim 1, which consists essentially of:
(a) heating a mixture of about 1 mol of a diacetate of a diphenol with about 2 mols of trimellitic anhydride and distilling about 2 mols of acetic acid therefrom,
(b) reacting about 2 mols of an aminophenyl acetylene with the reaction product of step (a) in a solvent at a temperature above about 50° C. to form an amic acid reaction product,
(c) adding to the reaction product of step (b) a solvent which forms an azeotrope with water, and
(d) heating the reaction mixture of step (c) to distill about 2 mols of water from the reaction mixture and convert the amic acid groups to imide groups; the diphenol diacetate employed having the structure:

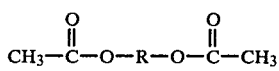

where R is an arylene group or a group having the structure:

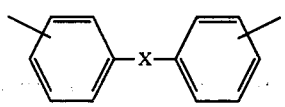

where X is

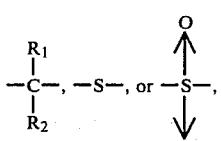

$R_1$ is an alkyl group containing 1 or 2 carbon atoms and $R_2$ is hydrogen or an alkyl group containing 1 or 2 carbon atoms.

13. A precursor of the product of claim 1, said precursor having the structure:

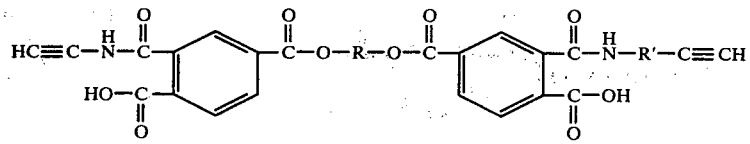

where R is an arylene group or a group having the structure:

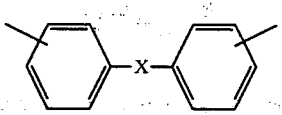

where X is

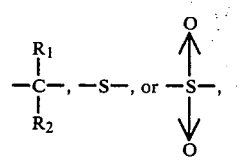

$R_1$ is an alkyl group containing 1 or 2 carbon atoms and $R_2$ is hydrogen or an alkyl group containing 1 or 2 carbon atoms; and where R' is a phenylene group.

14. A precursor of the product of claim 1, said precursor having the structure:

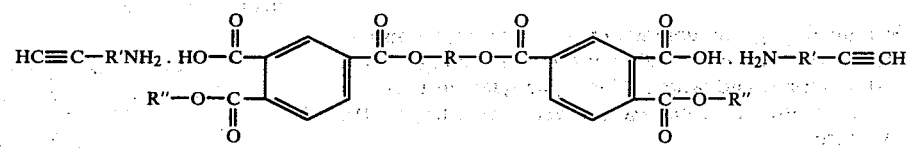

where R is an arylene group or a group having the structure:

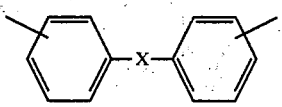

where X is

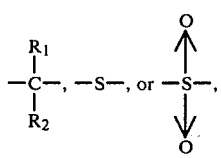

$R_1$ is an alkyl group alkyl group containing 1 or 2 carbon atoms and $R_2$ is hydrogen or an alkyl group containing 1 or 2 carbon atoms; where R' is a phenylene group; and where R" is a lower alkyl group containing up to about 5 carbon atoms.

15. A coating and laminating varnish consisting essentially of a product of claim 14 dissolved in an alkanol, a dialkyl ketone, or a lower ether; said solvent containing up to about 6 carbon atoms.

* * * * *